United States Patent
Bellemore et al.

[19]

[11] Patent Number: 6,145,086
[45] Date of Patent: *Nov. 7, 2000

[54] SECURITY AND PASSWORD MECHANISMS IN A DATABASE SYSTEM

[75] Inventors: John Bellemore, San Francisco; Ashwini Surpur, Fremont, both of Calif.

[73] Assignee: Oracle Corporation, Redwood Shores, Calif.

[*] Notice: This patent is subject to a terminal disclaimer.

[21] Appl. No.: 09/300,091

[22] Filed: Apr. 26, 1999

Related U.S. Application Data

[63] Continuation of application No. 08/866,038, May 30, 1997.

[51] Int. Cl.[7] .................. G06F 11/00; H04L 9/00
[52] U.S. Cl. ............................... 713/202; 380/23
[58] Field of Search .................... 713/202, 200, 713/201; 380/23, 4, 25; 395/600, 700, 490, 609, 729, 575; 711/163, 164; 364/286.4, 286.5; 340/825.34

[56] References Cited

U.S. PATENT DOCUMENTS

| | | |
|---|---|---|
| 5,335,346 | 8/1994 | Fabbio ..................... 395/600 |
| 5,394,471 | 2/1995 | Ganesan et al. ............ 380/23 |
| 5,572,673 | 11/1996 | Shurts ..................... 395/186 |
| 5,604,490 | 2/1997 | Blakley et al. .............. 340/825.31 |
| 5,611,048 | 3/1997 | Jacobs et al. ............... 395/200.09 |
| 5,644,711 | 7/1997 | Murphy ..................... 395/188.01 |
| 5,797,128 | 8/1998 | Birnbaum .................... 707/5 |
| 5,812,764 | 9/1998 | Heinz, Sr. .................. 395/188.01 |
| 5,850,448 | 12/1998 | Ganesan .................... 380/25 |
| 5,867,646 | 2/1999 | Benson et al. ............... 395/186 |
| 5,889,952 | 3/1999 | Hunnicutt et al. ............ 395/200.49 |
| 5,892,828 | 4/1999 | Perlman .................... 380/25 |
| 5,892,906 | 4/1999 | Chou et al. ................. 395/188.01 |
| 5,944,824 | 8/1999 | He .......................... 713/201 |
| 5,944,825 | 8/1999 | Bellemore et al. ............ 713/202 |

*Primary Examiner*—Nadeem Iqbal
*Attorney, Agent, or Firm*—Hickman Palermo Truong & Becker, LLP; Marcel K. Bingham

[57] ABSTRACT

A mechanism is described for determining whether a password may be used in a system that determines access privileges based on passwords. A computer system, such as a database system, receives user supplied routines that are each associated with a group of users. A proposed password (e.g. string) is received that is associated with a particular user that belongs to particular group. The user supplied routine associated with the group is used to determine whether the proposed password may be used as a password.

36 Claims, 5 Drawing Sheets

SECURITY AND PASSWORD MECHANISMS IN A DATABASE SYSTEM

This is a continuation of application Ser. No. 08/866,038, now pending, entitled "Security and Password Mechanisms in a Database System", filed by John Bellemore and Ashwini Surpur on May 30, 1997.

FIELD OF THE INVENTION

This invention pertains to the implementation of security features in computer systems, in particular to client-server database systems.

BACKGROUND OF THE INVENTION

In a client-server environment, an individual user may log-on to a client machine, but will need to establish a connection to a database located on a server machine across a network. In the typical scenario, to establish access, the user must pass the security mechanisms provided by either the operating system of the server machine, database system, or both. In the database systems, there are generally two methods of determining whether a user is permitted to establish access to a database.

In the first method, the database system omits implementing its own security mechanisms, thus relying solely upon the security mechanisms inherent in the operating system of the server machine. For example, if the server machine is a UNIX-based computer, then the standard UNIX user ID/security files can be employed to add a particular user to that machine's recognition list (e.g., by adding the user to the server's "/etc/passwd" file). In this type of configuration, if a user wishes to connect to a database on a remote server, the standard operating system's security checks are performed upon the user's request for access. If the user satisfies the operating system's security checks, then access is not only permitted to the server machine, but to the database itself.

A drawback to this method is that rights granted by the operating system may exceed those needed to merely access the database. This situation creates unnecessary security risks if the remote user has only need to access the database, and has no reason or purpose in accessing anything else on the server.

If the database system operates under a different operating system on different machines, then the users access rights may have to be maintained on multiple machines even when the operating systems on the different machines are the same. When the operating systems on different machines differ, the users are forced to learn multiple security mechanisms.

Regardless of whether the operating systems operating on different machines differ, a user may be required to change their password at different times. This situation creates two problems. First, users wishing to maintain identical passwords across all systems are forced to change their passwords everywhere necessary when just a single machine requires a password change. Users not maintaining identical passwords are forced to track multiple passwords, often manually.

To address the drawbacks of the first method, the second method provides for the database to maintain its own repository of valid users. When a remote user requests access to a database on a server, the remote user is checked against the repository of valid users. Remote users found in the repository are permitted access to the database on the server. In these database systems, a critical step in the security mechanism is to receive the user ID and the password and then verify that this combination is found in a repository of valid combinations of user IDs and passwords.

A problem with the second method is that the security mechanisms provided by database systems are typically not as secure as those provided by operating systems. Typically database systems merely check for valid combinations of user IDs and passwords. User IDs are most often based on names of users, names of projects, or some other easily guessed item related to the user. If a password is also selected in the same predictable manner, an infiltrator can not only easily guess the valid password, but the whole combination. Consequently, database systems may be vulnerable to commonly known techniques of infiltrating computer systems.

Even more carefully generated passwords that are not susceptible to guessing are vulnerable. An infiltrator in possession of a stolen or inappropriately disseminated password who knows the associated user can easily guess at valid combinations of user IDs and passwords. An infiltrator can also employ a computer automated methods of attempting numerous passwords based on common words or randomly generated strings of characters. Passwords consisting of a small number of characters are especially vulnerable. The smaller the number of characters the smaller number of permutations that have to be tried before uncovering the password.

Based on the foregoing, it is clearly desirable that a database system provide its own security features and forego reliance on the security mechanisms of the operating systems. It is further desirable that the database system employ security techniques that make the database system less vulnerable to infiltration than current database systems.

SUMMARY OF THE INVENTION

A mechanism is described for determining whether a password may be used in a system that determines access privileges based on passwords. According to an aspect of the present invention, a computer system, such as a database system, receives user supplied routines that are each associated with a group of users. A proposed password (e.g. string) is received that is associated with a particular user that belongs to particular group. The user supplied routine associated with the group is used to determine whether the proposed password may be used as a password.

BRIEF DESCRIPTION OF THE DRAWINGS

The present invention is illustrated by way of example, and not by way of limitation, in the figures the accompanying drawings and in which like reference numerals refer to similar elements and in which.

DETAILED DESCRIPTION OF THE PREFERRED EMBODIMENT

A method and apparatus for providing security and password mechanisms in a database system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
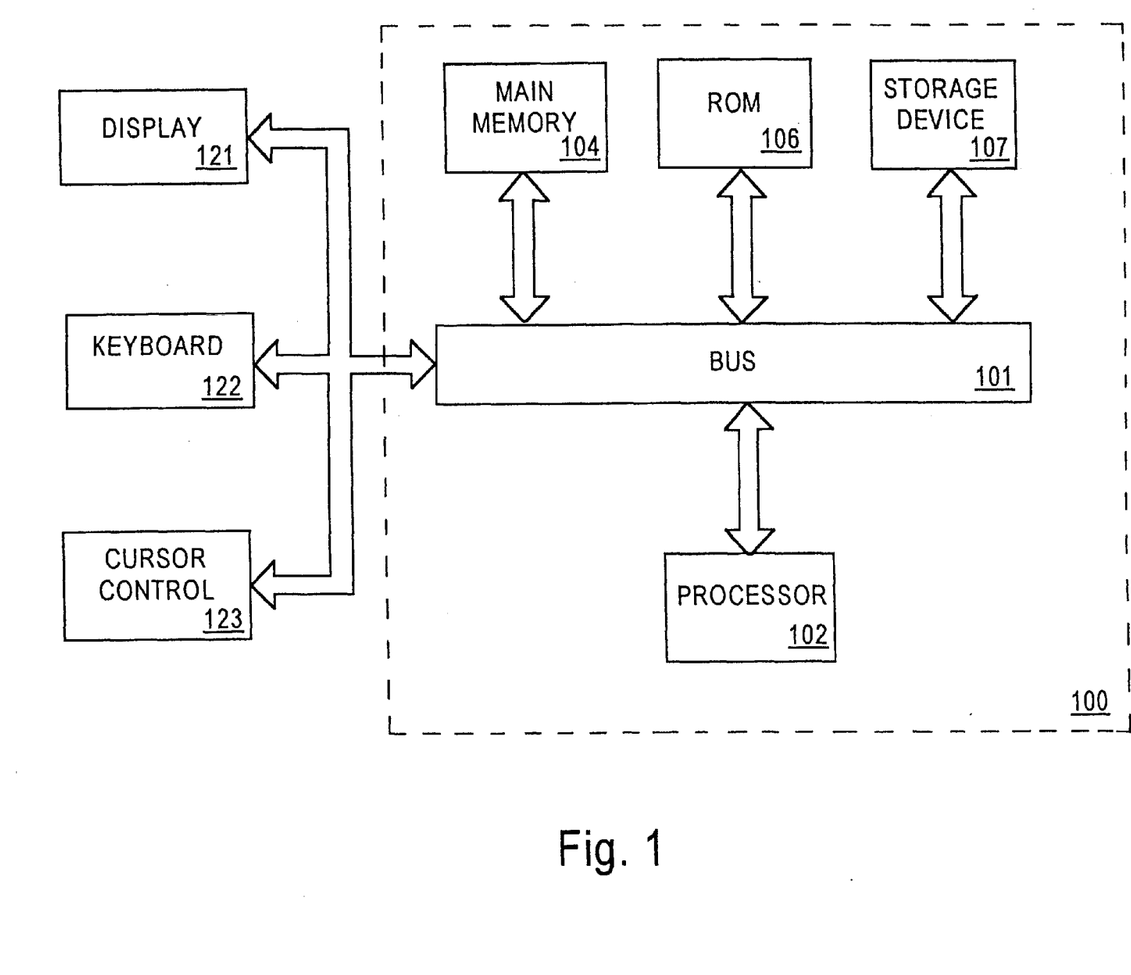
FIG. 1 is a block diagram of a computer system on which the present invention may be implemented.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to provide security and password mechanisms in a database system. According to one embodiment, providing security and password mechanisms in a database system is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

Figure 2:
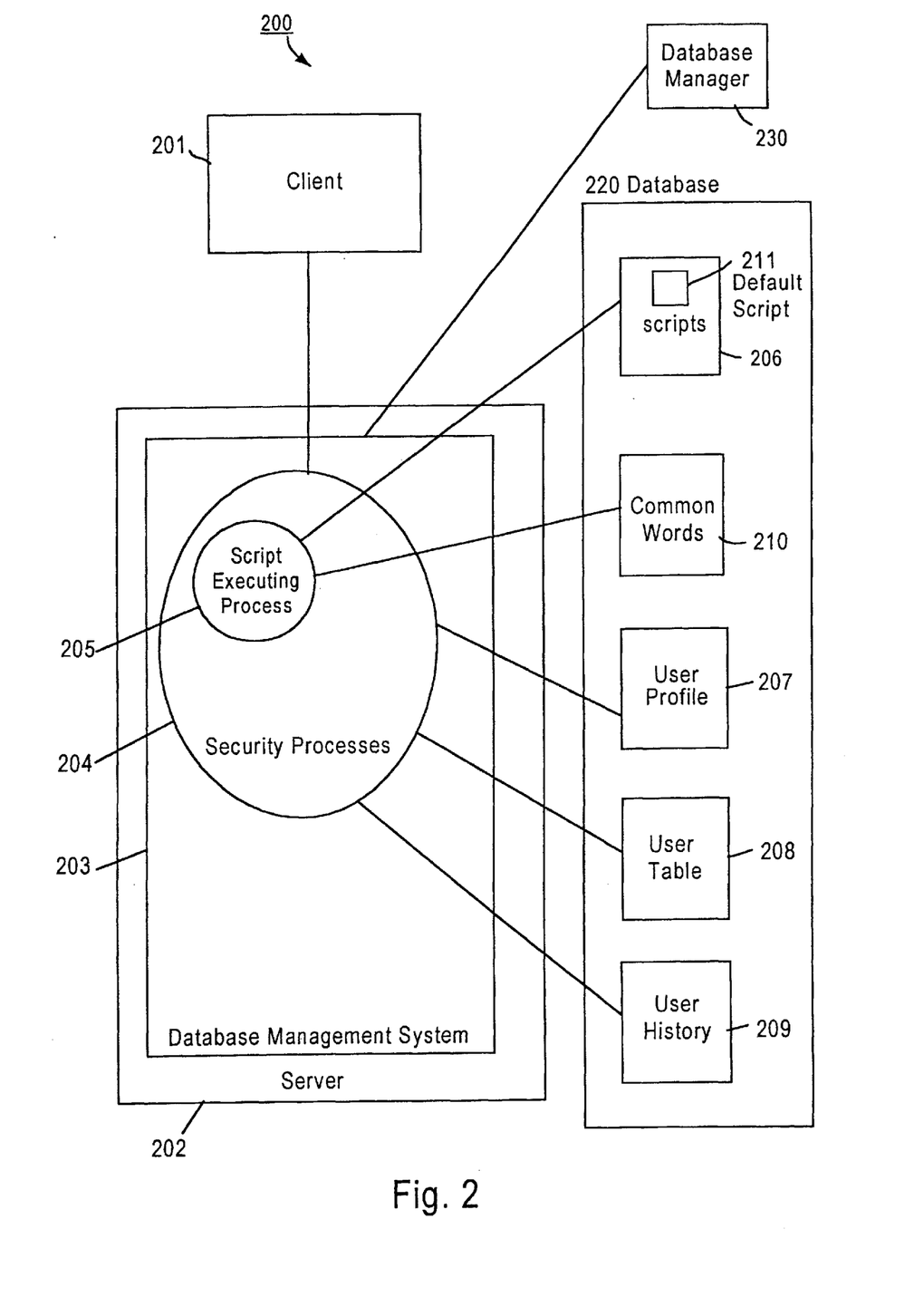
FIG. 2 illustrates a client/server architecture for a database system using the security and password mechanisms according to the embodiment of the invention.

FIG. 2 illustrates a computer apparatus upon which an embodiment of the present invention can be implemented, which includes a client 201, a server 202, a database management system 203, and a database 220, all of which may reside on a single node/machine or alternatively, on different nodes/machines in a computing network. If residing on a different node/machine, then a communication link, such as a network connection, is provided to connect the node/machine to support the various communications illustrated in FIG. 2.

In general, client 201 connects to the database management system 203 on the server 202 by transmitting a database connection message. Upon receiving this message, the database management system 203 invokes security process 204. The security process 204 receives a user ID and a password combination from the connection message transmitted by client 201. A valid user ID is associated with a password and an user account, both of which have been previously established with data base management system 203. When security process 204 receives the user ID and password combination transmitted by client 201, security process 204 then determines whether the combination of the user ID and the password is valid. If the combination is valid, the security process returns a message to the database management system 203 indicating that the combination is valid. The database management system 203 then permits the database connection request to proceed.

From time to time, the security and password mechanisms require changing the password associated with a user ID. To accommodate this requirement, the client 201 transmits a change password message to database management system 203. The database management system 203 invokes the security process 204 to determine whether the newly requested user ID and password combination meets certain criteria. If the combination meets the certain criteria, the security process 204 will transmit a message indicating that the combination meets the criteria.

DATABASE TABLES

Figure 4:
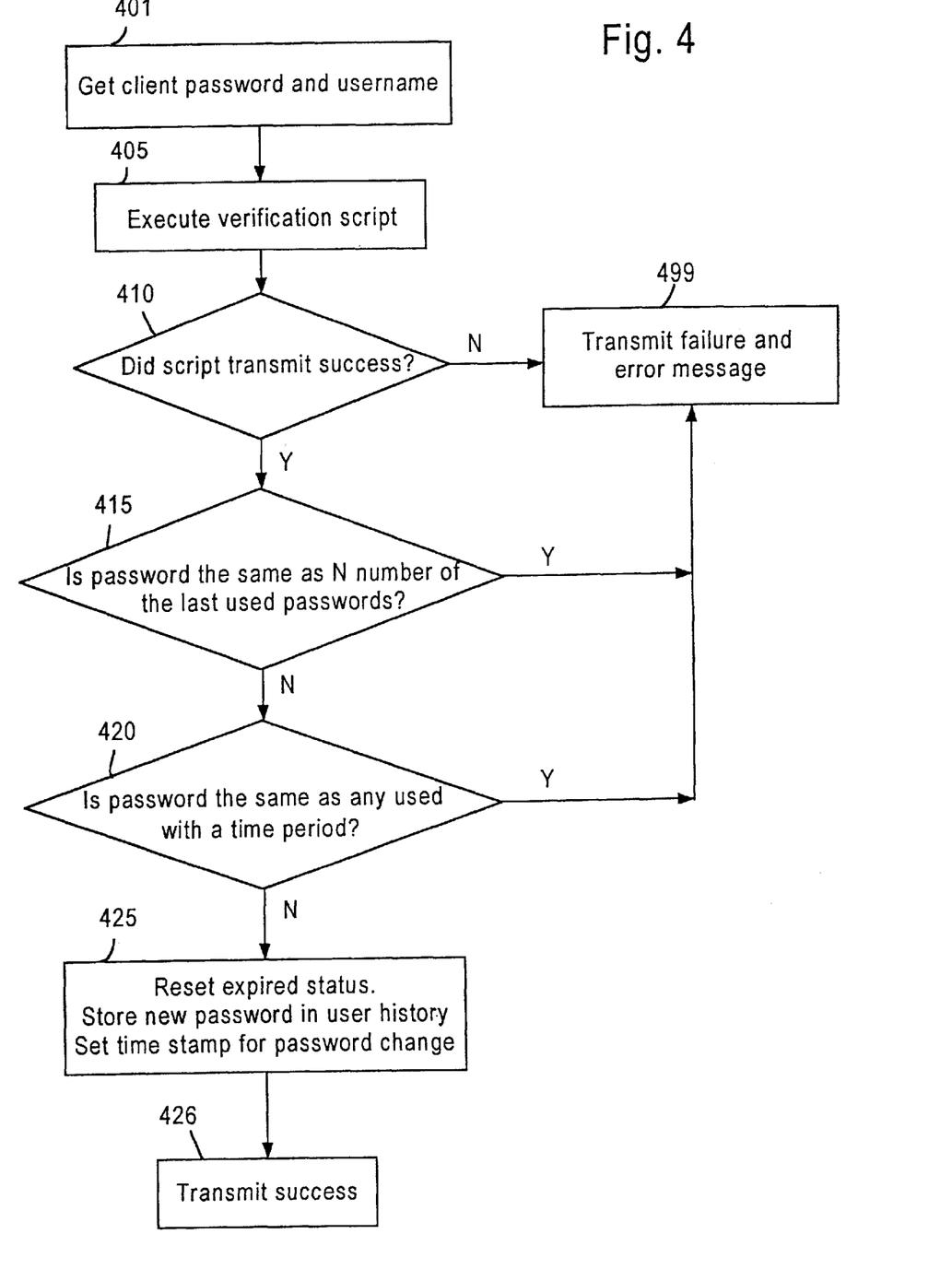
FIG. 4 illustrates the steps performed by the embodiment of the invention in response to receiving a password change request message from a client.
Figure 5:
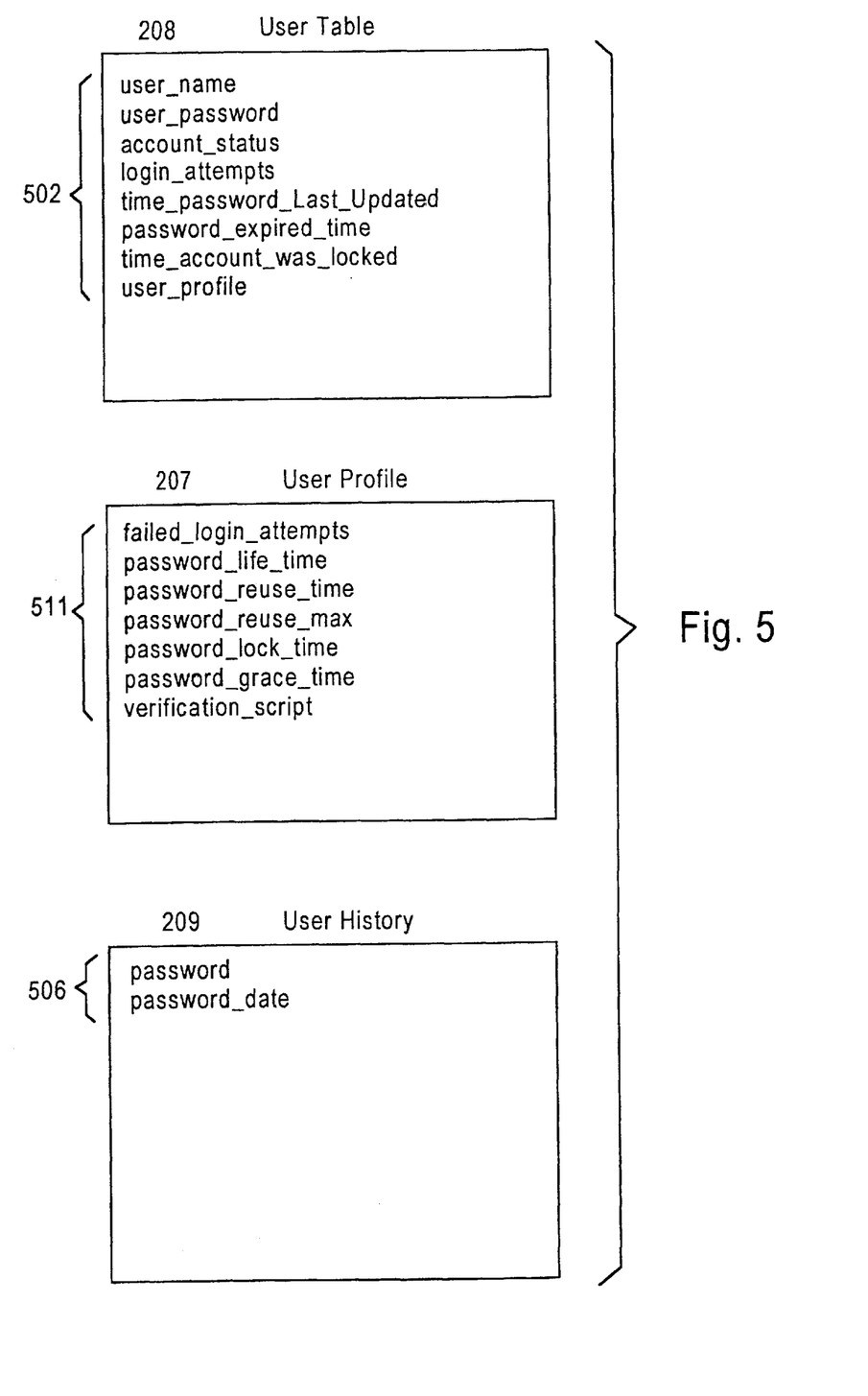
FIG. 5 illustrates the data base table and fields used by the embodiment of the invention.

The operation of the computer apparatus 200 of FIG. 2 is now described in more detail. FIG. 4 and FIG. 5 show the detailed steps of the security process 204. To perform these steps, security process 204 uses information from tables contained in database 220. According to one embodiment, these tables are the user profile table 207, the user history table 209, and the user table 208. These tables shall be described in greater detail below. According to one embodiment, user profile table 207, user table 208, and user history table 209 are relational database tables composed of fields and rows.

The columns of user profile table 207, user table 208, and user history table 209 are shown in detail in FIG. 5. The names of the fields in FIG. 5 are illustrative. The tables may contain other fields. User table 208 contains plurality of fields 502, user profile table 207 contains plurality of fields 511, and user history table 209 contains plurality of fields 506. Security process 204 reads data from all tables at various points in the steps it executes. Security process 204 also updates user table 208 and user history table 209. Typically user profile table 207 is updated by database management system 203 based on commands received from database manager 230.

Plurality of fields 502 of user table 208 contain data which represent current states of a user account. The user_name field contains the user ID and the user_password field contains the password associated with the user ID. The account_status field contains values which represent various statuses about the user account associated with the user ID, such as whether the account is temporarily locked or permanently locked. The login_attempts contains a value denoting the number of consecutive attempts in which an invalid password was used in combination with the user account to connect to a database. The time_password_last_updated field indicates the date and time the password was last changed, the password_expired_time field indicates the date and time the password will expire, and the time_account_was_locked field indicates the time the account was temporarily or permanently locked.

Plurality of fields 511 of the user profile table 207 contain data which represent thresholds associated with individual users or classes of users. The failed_login_attempts field represents a threshold number of attempts of using an invalid password in combination with a user ID that can occur before temporarily locking the account. The password_life_time field represents the period of time that elapses before the password is required to be changed. The password_reuse_time field represents the period of time in which the use of a password for a user ID can not be repeated. The password_reuse_max represents the number of most recently used passwords that must exist before a password can be reused for a particular user ID. The password_verify_function field represents a script of plurality of scripts 206. The password_lock_time field contains the period of time to temporarily lock a user ID. The password_grace_time field represents the period of time allotted to change a password after the password life time has been expired.

The user history table contains data about previously used passwords. The password field contains the old password. The password_date field represents the date and time the password was entered.

While one combination of tables and fields has been described, alternate combinations of tables and fields are possible. Such alternate combinations can include more or less tables and more or less fields. Therefore, it is understood that the present inventions is not limited to any specific combination of tables and fields.

LOCKING USER IDS

Figure 3:
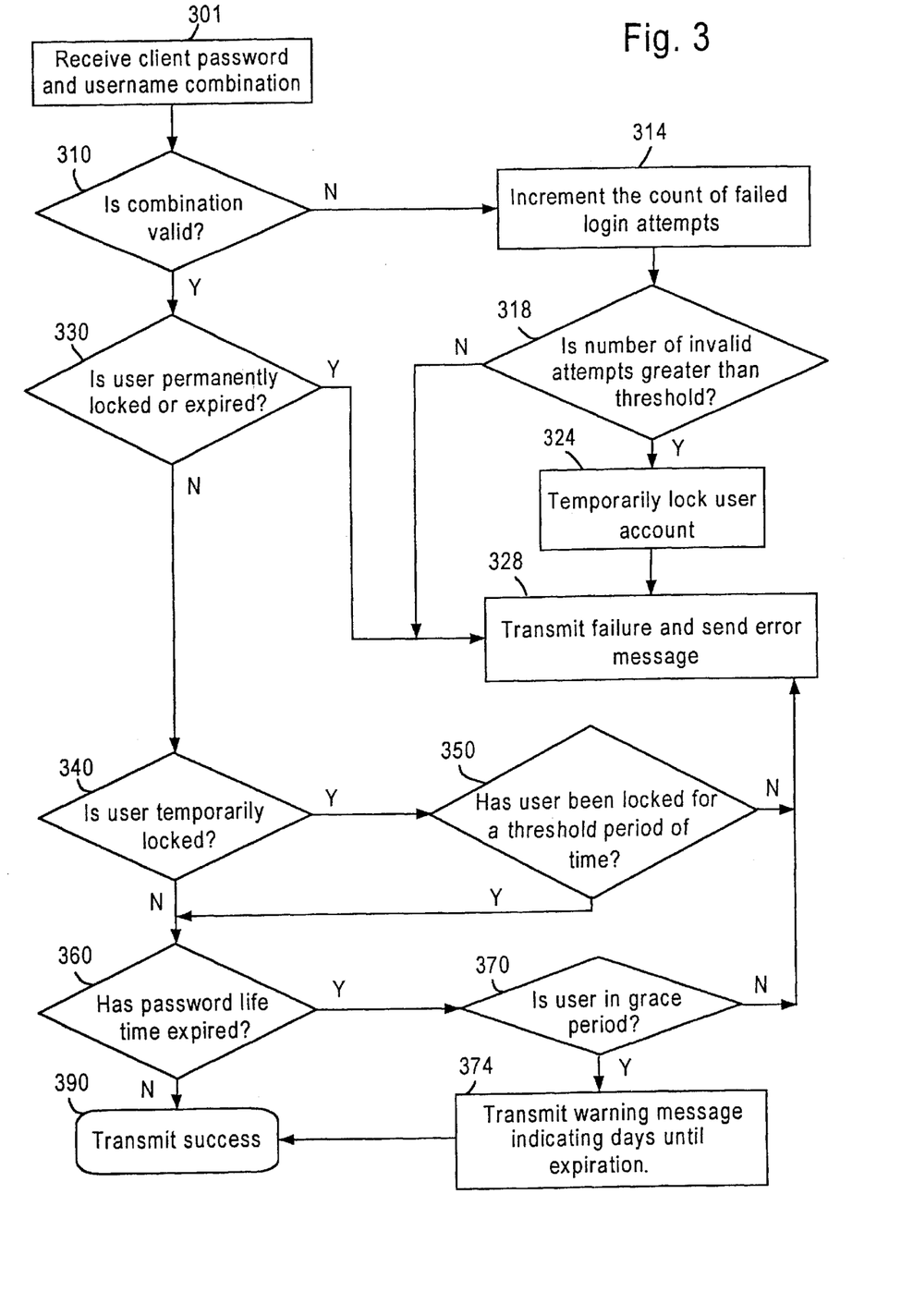
FIG. 3 illustrates the steps performed by the embodiment of the invention in response to receiving a user ID and password for a client.

FIG. 3 shows the steps undergone by security process 204 in response to client 201 transmitting a connection message to database management system 203 which in turn invokes security process 204. In step 301, security process 204 receives the client user ID and password from a message transmitted from the database management system 203 to security process 204.

In step 310, a determination is made of whether the user ID and password combination transmitted is valid. A valid combination of a user ID and a password is found in the user_name and user_password fields of user table 208. If the user ID and password combination is invalid, control passes to step 314.

In step 314, a count of a failed number of attempts to use an invalid password and user ID is incremented. In step 318, a determination is made of whether a number of attempts to use an invalid password for a user ID exceeds a threshold. The threshold is represented by the failed_login_attempts field in user profile table 207. If the threshold is exceeded, then control passes to step 324. Otherwise control flows to step 328.

In step 324, the user account associated with the user ID is temporarily locked by updating the account_status field in user table 208 to a value which represents that the account is temporarily locked. As shall be explained in further detail below, a user account is temporarily locked after updating the account_status field in user table 208 because security process 204 fails the connection request based on the account_status field. In step 328, a message indicating a failure to log-on and the type of error causing the failure is transmitted to database management system 203.

If the user ID and password combination transmitted is valid, then control flows to step 330. In step 330, a determination is made of whether the user account associated with the user ID is permanently locked. In an alternate embodiment of the invention, a determination is also made of whether the user account is expired. The account_status field in user table 208 indicates whether the user account is permanently locked or expired. As shall be explained in further detail below, the user account associated with the user ID is expired by updating the account_status to a value indicating that the user account is expired.

The user account can be permanently locked by updating the account_status to a value indicating that the user account is permanently locked. For example, when an employee terminates, the database management system 203 could receive commands originating from database manager 230 to update the account_status to a value indicating that the former employee's user account is locked.

In step 340, a determination is made of whether the user ID is temporarily locked. The account_status field in user table 208 indicates whether the user is temporarily locked. In step 350, a determination is made of whether the user has been temporarily locked for a threshold period of time. This threshold period of time is represented by the password_lock_time field in the user profile table 207.

EXPIRING PASSWORDS

In an alternate embodiment of the invention, step 360 and step 370 are performed as part of a mechanism for expiring passwords. In step 360, a determination is made of whether a password life time associated with the password has expired. The password life time has expired if the password has not been changed for a period exceeding a threshold period of time. This threshold is represented by the password_life_time field in user profile table 207. If the password_expired_time field in user table 208 has not yet been updated to reflect the expiration of the password life time, the password_expired_time field is updated based on the password_grace_time field in user profile table 207 and the current time. The point of time at which this update occurs marks the beginning of the grace period. The account_status field in user table 208 is updated to indicate that the user is in the grace period.

In step 370, a determination is made of whether the client is still in the grace period. If the current time exceeds the time represented by the password_expired_time field in user table 208, the user is no longer in the grace period. The account_status field in user table 208 is updated to a value indicating that the user account is expired.

In step 374, a warning message is transmitted indicating that the password will expire in n number of days. In step 390, a message of success is transmitted to database management system 203.

ENSURING PASSWORDS ARE SECURE

FIG. 4 illustrates the steps undertaken by security process 204 when client 201 transmits a password change request message to database management system 203. In step 401, a security process 204 receives the client user ID, password, and the proposed password.

In step 405, a script of plurality of scripts is executed. Security process 204 transmits a message to script executing process 205. The message transmitted to script executing process 205 includes the user ID, the proposed password, and the current password. Script executing process 205 executes the script represented by field the verification_ script in the user profile table 207. Script executing process transmits a message to security process 204 indicating whether the proposed password meets the criteria embodied in the script.

In step 410, a determination is made by security process 204 of whether execution of the verification script transmitted success or failure. In step 499, a message indicating whether the password and user ID combination is valid is transmitted to database management system 203, which in turn transmits the message to client 201.

VERIFICATION SCRIPTS

Scripts 206 are routines implemented in a scripting programming language. In one embodiment, a routine is written in a scripting programming language such as PL/SQL developed by Oracle Corporation. Scripts implemented in PL/SQL provide the functionality available in routines implemented in other standard languages. The text represents computer instructions. Some of the text can embody criteria for passwords.

The use of scripts facilitates the extension of the security and password mechanisms. The criteria that proposed passwords must meet can be expanded. For example, a script can embody criteria that requires that the proposed password differ by the old password by three characters. A script can also embody complexity criteria, such as requiring that a proposed password must contain a number of alphabetic characters, a number of numeric characters, and a number of punctuation characters. Because a script can operate on data from user table 208, user profile table 207, and user history table 209, security mechanisms can be expanded to include additional criteria based on data from user table 208, user profile table 207, and user history table 209.

The scripts can also embody other criteria based on data from other tables or databases. As an illustration, a criterion could be that users that connect to a database after a certain time belong to a certain class of employees. Based on the user ID, the script could query an employee table in another database to determine the class of the employee associated with the user ID.

In one embodiment of the invention, a default script 211 and a common word table 210 is provided. The default script 211 embodies a default set of criteria. The first criterion is that a proposed password must have a minimum length of 4. Second, the proposed password must vary from the current password by at least three characters. Next, the minimum complexity of the proposed password requires that the proposed password contain at least one alpha, one numeric, and one punctuation character. Finally, the password must not be a common word.

The default script 211 determines whether a string of characters is common by querying the common word table 210. The common word table 210 contains commonly used strings of characters such as "hello", "welcome", or "1234". Because the common word table 210 is a relational database table, it is easily expanded.

The following is example of a script. Although the example may resemble the PL/SQL programming language by Oracle Inc., the example is merely for illustrative purposes and is not meant to be representative of an actual code implementation.

```
CREATE FUNCTION verify_routine(
    userid IN VARCHAR(30),
    password IN VARCHAR(30),
    old_password IN VARCHAR(30))
RETURN BOOLEAN
IF
    .
    .
    .
BEGIN
    -- Check for the password length
    IF LENGTH(password)<4 THEN
        RETURN FALSE
    END IF;
    -- Password should not be the same as the userid
    IF password = userid THEN
        RETURN FALSE
    END IF;
    -- Check password to see if it contains at least one alpha, one number, -- and
    one punctuation mark.
    [code to perform to ensure password contains one alpha, one number, and one
    punctuation mark]
    .
    .
    .

-- Verify that the password differs from the previous password by at -- least
    3 characters
    .
    .
    .
    If password IN 'welcome', 'oracle', 'password', 'database', 'account' THEN
        RETURN FALSE
    END IF;
    RETURN TRUE
END
```

In alternate embodiments of the invention, routines written in alternate computer languages can be invoked in addition to or in place of routines written in a scripting language. Therefore, it is understood that the present invention is not limited to scripts written in any specific computer language.

PREVENTING PREVIOUSLY USED PASSWORDS

In step 415, a determination is made of whether the proposed password is the same as of the N most recently used passwords of that particular user, where N is a value represented by the password_reuse_max field in user profile table 207. In step 420, a determination is made of whether the password is same as any used within a threshold period of time. This threshold period of time is represented by the field password_reuse_time field in user profile table 207.

In step 425, the client is taken out of expired status. The user_password, account_status, and password_expired_time fields in user table 208 are updated. The new password (i.e. the proposed password) is stored in history table 209. In step 426, security process 204 transmits a message to database management system 203.

The present invention offers advantages over prior approaches to password and security mechanisms for database systems. The password and security mechanisms of the database system operate independently of the password and security mechanisms of the operating system. Clients with no reason to access a server other than to connect to a database do not have to be given a user ID and password which could give them access to the operating system. Clients connecting on multiple servers are presented with just one security and password mechanism. Furthermore, the multiple servers could share a common set of tables for scripts, user profiles, users, and user history. The client and servers need only maintain one set of passwords. Finally, those selecting operating systems on which to run the databases are not constrained to the operating systems that provide the desired security and password mechanisms. These purchasers can rely instead on the database system for their security and password mechanism. The plurality of scripts 206 enable the invention to flexibly meet the varied security and password mechanism requirements of many communities of users.

Use of user profiles facilitates the maintenance of the security and password mechanisms for a class of clients. Users who share a common set of security criteria can be organized into classes represented by a user profile. The common set of criteria are embodied in the plurality of fields 511 in the user profile table, and in plurality of scripts 206. A user is assigned to a user profile through the field user_profile in the user table 208, and is assigned a script through the verification_script field in user profile table 207. The security characteristics for a plurality of users can be modified by merely modifying one user profile. For instance, to switch a class of users to a new set of criteria embodied in a new script of scripts 206, only the verification_script field in user profile table 207 need be modified.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining whether a proposed password may be used as a password in a system that determines access privileges based on passwords, the method comprising the steps of:

receiving user input that defines a routine, wherein said routine accepts as input a proposed password value and generates output which indicates whether the proposed password satisfies a first set of one or more criteria;

storing said routine;

receiving said proposed password;

in response to receiving the proposed password, performing the steps of:

passing said proposed password to said routine, and executing said routine to determine whether said proposed password satisfies a first set of one or more criteria;

if said proposed password satisfies a second set of one or more criteria that includes the first set of one or more criteria, then storing said proposed password and allowing said proposed password to be used as a password in said system; and if said proposed password does not satisfy the second set of one or more criteria, then generating a message to indicate that said proposed password is not acceptable and preventing said proposed password from being used as a password in said system.

2. The method of claim 1 wherein:

the step of receiving user input that defines a routine includes the step of receiving a script written in a scripting language; and the step executing said routine includes the step of executing said script.

3. The method of claim 2, wherein the step of receiving a script includes receiving a script written in PL/SQL.

4. The method of claim 1 wherein:

said system is a database system; and the step of storing said routine includes storing said routine in said database system.

5. A method for determining whether a proposed password associated with a particular user may be used as a password in a system that determines access privileges based on passwords, the method comprising the steps of:

receiving user input that defines a first routine associated with a first set of one or more users, wherein said first routine accepts as input a given password value and generates output which indicates whether the given password value satisfies a first set of criteria;

receiving user input that defines a second routine associated with a second set of one or more users, wherein said second routine accepts as input a given password value and generates output which indicates whether the given password value satisfies a second set of one or more criteria;

storing said first routine;

storing said second routine;

receiving said proposed password;

if said particular user is a member of said first set of one or more users, then executing a first set of one or more routines that includes said first routine but not said second routine to determine whether said proposed password may be used as a password;

if said particular user is a member of said second set of one or more users, then executing a second set of one or more routines that includes said second routine but not said first routine to determine whether said proposed password may be used as a password; and if said proposed password may be used as a password, then storing said proposed password.

6. The method of claim 5 wherein:

the step of receiving user input that defines a routine includes the step of receiving a script written in a scripting language; and the step of executing said routine includes the step of executing said script.

7. The method of claim 6, wherein the step of receiving a script includes receiving a script written in PL/SQL.

8. The method of claim 5 wherein:

said system is a database system; and the step of storing said routine includes storing said routine in said database system.

9. A method for determining whether a string of data may be used as a password in a system that determines access privileges based on passwords, the method comprising the steps of:

receiving user input that defines a plurality of routines that are each associated with a set of users, wherein each routine of said plurality of routines accepts as input a given password value and generates output which indicates whether the given password value satisfies one or more criteria;

for said each routine of said plurality of routines, storing in one or more data structures data that establishes the association between said each routine and the set of users associated with the routine;

receiving a proposed password associated with a user;

selecting a first routine to call from said plurality of routines based on said one or more data structures, wherein the first routine generates a first output that indicates whether the given password satisfies a first set of one or more criteria;

determining whether said proposed password satisfies a second set of one or more criteria that includes said first set of one or more criteria, wherein the step of determining whether said proposed password satisfies a second set of one or more criteria includes:

executing one or more routines that includes said first routine, and determining whether said proposed password satisfies the first set of one or more criteria based on said output generated by executing said first routine;

if said proposed password satisfies said second set of one or more criteria, then storing said proposed password and allowing said proposed password to be used as a password in said system.

10. The method of claim 9, wherein:

the step of storing in one or more data structures includes storing an association between said each routine and a user class;

the method further includes the steps of determining a first user class associated with said first user; and wherein the step of selecting a first routine includes selecting a first routine based on said first user class.

11. The method of claim 9, wherein:

each of said plurality of routines is written in a scripting language; and the step of receiving user input that defines a plurality of routines includes receiving data that defines one or more scripts written in said scripting language.

12. The method of claim 11, wherein the step of receiving data that defines one or more scripts includes receiving data that defines one or more scripts written in PL/SQL.

13. The method of claim 9, wherein:

said system is a database system; and =p1 the step of receiving user input is performed by said database system.

14. A computer-readable medium carrying one or more sequences of one or more instructions for determining whether a proposed password may be used as a password in a system that determines access privileges based on passwords, the one or more sequences of one or more instructions including instructions which, when executed by one or more processors, cause the one or more processors to perform the steps of:

receiving user input that defines a routine, wherein said routine accepts as input a proposed password value and generates output which indicates whether the proposed password satisfies a first set of one or more criteria;

storing said routine;

receiving said proposed password;

in response to receiving the proposed password, performing the steps of:

passing said proposed password to said routine, and executing said routine to determine whether said proposed password satisfies a first set of one or more criteria;

if said proposed password satisfies a second set of one or more criteria that includes the first set of one or more criteria, then storing said proposed password and allowing said proposed password to be used as a password in said system; and if said proposed password does not satisfy the second set of one or more criteria, then generating a message to indicate that said proposed password is not acceptable and preventing said proposed password from being used as a password in said system.

15. The computer-readable medium of claim 14 wherein:

the step of receiving user input that defines a routine includes the step of receiving a script written in a scripting language; and the step executing said routine includes the step of executing said script.

16. The computer-readable medium of claim 15, wherein the step of receiving a script includes receiving a script written in PL/SQL.

17. The computer-readable medium of claim 14 wherein:

said system is a database system; and the step of storing said routine includes storing said routine in said database system.

18. A computer-readable medium carrying one or more sequences of one or more instructions for determining whether a proposed password associated with a particular user may be used as a password in a system that determines access privileges based on passwords, the one or more sequences of one or more instructions including instructions which, when executed by one or more processors, cause the one or more processors to perform the steps of:

receiving user input that defines a first routine associated with a first set of one or more users, wherein said first routine accepts as input a given password value and generates output which indicates whether the given password value satisfies a first set of criteria;

receiving user input that defines a second routine associated with a second set of one or more users, wherein said second routine accepts as input a given password value and generates output which indicates whether the given password value satisfies a second set of one or more criteria;

storing said first routine;

storing said second routine;

receiving said proposed password;

if said particular user is a member of said first set of one or more users, then executing a first set of one or more routines that includes said first routine but not said second routine to determine whether said proposed password may be used as a password;

if said particular user is a member of said second set of one or more users, then executing a second set of one or more routines that includes said second routine but not said first routine to determine whether said proposed password may be used as a password; and if said proposed password may be used as a password, then storing said proposed password.

19. The computer-readable medium of claim 18 wherein:

the step of receiving user input that defines a routine includes the step of receiving a script written in a scripting language; and the step of executing said routine includes the step of executing said script.

20. The computer-readable medium of claim 19, wherein the step of receiving a script includes receiving a script written in PL/SQL.

21. The computer-readable medium of claim 18 wherein:

said system is a database system; and the step of storing said routine includes storing said routine in said database system.

22. A computer-readable medium carrying one or more sequences of one or more instructions for determining whether a string of data may be used as a password in a system that determines access privileges based on passwords, the one or more sequences of one or more instructions including instructions which, when executed by one or more processors, cause the one or more processors to perform the steps of:

receiving user input that defines a plurality of routines that are each associated with a set of users, wherein each routine of said plurality of routines accepts as input a given password value and generates output which indicates whether the given password value satisfies one or more criteria;

for said each routine of said plurality of routines, storing in one or more data structures data that establishes the association between said each routine and the set of users associated with the routine;

receiving a proposed password associated with a user;

selecting a first routine to call from said plurality of routines based on said one or more data structures, wherein the first routine generates a first output that indicates whether the given password satisfies a first set of one or more criteria;

determining whether said proposed password satisfies a second set of one or more criteria that includes said first set of one or more criteria, wherein the step of determining whether said proposed password satisfies a second set of one or more criteria includes:

executing one or more routines that includes said first routine, and determining whether said proposed password satisfies the first set of one or more criteria based on said output generated by executing said first routine;

if said proposed password satisfies said second set of one or more criteria, then storing said proposed password and allowing said proposed password to be used as a password in said system.

23. The computer-readable medium of claim 22, wherein:

the step of storing in one or more data structures includes storing an association between said each routine and a user class;

the method further includes the steps of determining a first user class associated with said first user; and wherein the step of selecting a first routine includes selecting a first routine based on said first user class.

24. The computer-readable medium of claim 22, wherein:

each of said plurality of routines is written in a scripting language; and the step of receiving user input that defines a plurality of routines includes receiving data that defines one or more scripts written in said scripting language.

25. The computer-readable medium of claim 24, wherein the step of receiving data that defines one or more scripts includes receiving data that defines one or more scripts written in PL/SQL.

26. The computer-readable medium of claim 22, wherein:

said system is a database system; and the step of receiving user input is performed by said database system.

27. A method for determining whether a proposed password may be used as a password in a system that determines access privileges based on passwords, the method comprising the steps of:

receiving user input that defines a routine, wherein said routine accepts as input a proposed password value and generates output which indicates whether the proposed password satisfies a first set of one or more criteria;

storing said routine;

receiving said proposed password;

in response to receiving the proposed password, performing the steps of:

passing said proposed password to said routine, and executing said routine to determine whether said proposed password satisfies a first set of one or more criteria; and if said proposed password does not satisfy the first set of one or more criteria, then generating a message to indicate that said proposed password is not acceptable and preventing said proposed password from being used as a password in said system.

28. The method of claim 27, further including the step of if said proposed password satisfies a second set of one or more criteria that includes the first set of one or more criteria, then storing said proposed password and allowing said proposed password to be used as a password in said system.

29. The method of claim 27 wherein:

the step of receiving user input that defines a routine includes the step of receiving a script written in a scripting language; and the step executing said routine includes the step of executing said script.

30. The method of claim 27, wherein the step of receiving a script includes receiving a script written in PL/SQL.

31. The method of claim 27 wherein:

said system is a database system; and the step of storing said routine includes storing said routine in said database system.

32. A computer-readable medium carrying one or more sequences of one or more instructions for determining whether a proposed password may be used as a password in a system that determines access privileges based on passwords, the one or more sequences of one or more instructions including instructions which, when executed by one or more processors, cause the one or more processors to perform the steps of:

receiving user input that defines a routine, wherein said routine accepts as input a proposed password value and generates output which indicates whether the proposed password satisfies a first set of one or more criteria;

storing said routine;

receiving said proposed password;

in response to receiving the proposed password, performing the steps of: passing said proposed password to said routine, and executing said routine to determine whether said proposed password satisfies a first set of one or more criteria; and     if said proposed password does not satisfy the first set of one or more criteria, then generating a message to indicate that said proposed password is not acceptable and preventing said proposed password from being used as a password in said system.

33. The computer-readable medium of claim 32, further including sequences of instructions for performing the step of if said proposed password satisfies a second set of one or more criteria that includes the first set of one or more criteria, then storing said proposed password and allowing said proposed password to be used as a password in said system.

34. The computer-readable medium of claim 32, wherein:

the step of receiving user input that defines a routine includes the step of receiving a script written in a scripting language; and     the step executing said routine includes the step of executing said script.

35. The computer-readable medium of claim 32, wherein the step of receiving a script includes receiving a script written in PL/SQL.

36. The computer-readable medium of claim 32 wherein:

said system is a database system; and the step of storing said routine includes storing said routine in said database system.

* * * * *

UNITED STATES PATENT AND TRADEMARK OFFICE
CERTIFICATE OF CORRECTION

PATENT NO. : 6,145,086
DATED : November 7, 2000
INVENTOR(S) : John Bellemore, et al.

Page 1 of 1

It is certified that error appears in the above-identified patent and that said Letters Patent is hereby corrected as shown below:

Column 12,
Line 5, delete "=p1".

Signed and Sealed this

Second Day of October, 2001

Attest:

*Nicholas P. Godici*

NICHOLAS P. GODICI
*Attesting Officer*   *Acting Director of the United States Patent and Trademark Office*